United States Patent [19]

Yajima et al.

[11] Patent Number: 5,315,871

[45] Date of Patent: May 31, 1994

[54] THERMAL FLOWMETER WITH DETECTING ELEMENT SUPPORTED BY SUPPORTS HAVING ENGAGING PORTIONS

[75] Inventors: Yasuhito Yajima, Nagoya; Zenji Ishikawa, Anjo; Syuichi Yamauchi, Nagoya, all of Japan

[73] Assignee: NGK Insulators, Ltd., Japan

[21] Appl. No.: 37,447

[22] Filed: Mar. 26, 1993

Related U.S. Application Data

[63] Continuation of Ser. No. 705,651, May 24, 1991, Pat. No. 5,224,378.

[30] Foreign Application Priority Data

May 31, 1990 [JP] Japan .................................. 2-58058

[51] Int. Cl.⁵ .................................................. G01F 1/68
[52] U.S. Cl. .................................. 73/204.25; 338/318
[58] Field of Search .......... 73/204.25, 204.26, 204.27, 73/118.2; 338/25, 276, 318, 322

[56] References Cited

U.S. PATENT DOCUMENTS

| | | | |
|---|---|---|---|
| 4,299,125 | 11/1981 | Romann et al. | 73/204.27 |
| 4,393,697 | 7/1983 | Sato et al. | 73/204.27 |
| 4,513,615 | 4/1985 | Sato et al. | 73/204.25 |
| 4,549,433 | 10/1985 | Gneiss et al. | 338/318 |
| 4,554,829 | 11/1985 | Sumal | 338/318 |
| 4,887,462 | 12/1989 | Gneiss . | |
| 4,903,001 | 2/1990 | Kikuchi . | |
| 4,909,079 | 3/1990 | Nishimura et al. . | |
| 4,911,009 | 3/1990 | Maeda et al. . | |
| 4,920,635 | 5/1990 | Yajima . | |

FOREIGN PATENT DOCUMENTS

| | | |
|---|---|---|
| 55-43447 | 3/1980 | Japan . |
| 56-77716 | 6/1981 | Japan . |
| 60-91211 | 5/1985 | Japan . |

*Primary Examiner*—Herbert Goldstein
*Attorney, Agent, or Firm*—Parkhurst, Wendel & Rossi

[57] ABSTRACT

A thermal flowmeter for determining a parameter of a fluid flowing through a passage, including a detecting element, and a pair of electrically conductive supports fixed to a wall defining the passage for supporting the detecting element. The detecting element includes a substrate, an electrically resistive body disposed on the substrate and having an electrical resistance which varies with an ambient temperature, and a pair of electrical conductors provided at opposite ends of the support and electrically connected to the electrically resistive body. The detecting element is positioned in the passage such that the electrical conductors are secured to the electrically conductive supports. The electrically conductive supports have respective engaging portions which engage the electrical conductors, respectively, for positioning the detecting element with respect to the wall of the passage.

4 Claims, 4 Drawing Sheets

THERMAL FLOWMETER WITH DETECTING ELEMENT SUPPORTED BY SUPPORTS HAVING ENGAGING PORTIONS

This application is a Rule 60 Continuation Application of U.S. Ser. No. 07/705,651 filed May 24, 1991 now U.S. Pat. No. 5,224,378.

BACKGROUND OF THE INVENTION

1. Field of the Invention

The present invention relates in general to a thermal flowmeter including at least one detecting element which utilizes temperature dependence of its electrical resistance to determine a flow rate or velocity of a fluid flowing in a passage. More particularly, the invention is concerned with an improvement on such a thermal flowmeter, which can determine the fluid flow rate with enhanced detecting accuracy.

2. Discussion of the Related Art

As one type of a flowmeter for measuring a flow rate or velocity of a fluid having a varying temperature, e.g., an intake air introduced into an internal combustion engine, there is known a thermal flowmeter as disclosed in laid-open Publication Nos. 55-43447, 56-77716 and 60-91211 of unexamined Japanese Patent Applications, which flowmeter includes detecting elements whose electrical resistance varies with an ambient temperature. This thermal flowmeter is adapted to determine a flow rate of a fluid flowing in a passage, by utilizing the temperature dependence of the electrical resistance of the detecting element.

More specifically, the thermal flowmeter has two detecting elements, each of which includes a substrate made of an electrically insulating material, an electrically resistive body formed on the substrate, and a pair of electrical conductors or leads which are secured to opposite ends of the substrate and electrically connected to the resistor body. The resistor body has an electrical resistance whose value varies with the temperature of the ambient atmosphere. The thermal flowmeter further includes two pairs of electrically conductive supports which are fixed to a wall that defines the fluid passage, and protrude suitable distances from the wall into the passage, for supporting the detecting elements at the electrical conductors.

Upon measurement of the flow rate of the fluid flowing in the fluid passage, one of the two detecting elements is used as a temperature-measuring element which has the same temperature as the fluid to be measured. This detecting element is adapted to measure the temperature of the fluid, by detecting a change in the electrical resistance of the resistive body when it is energized by an electric current which is so small as to generate a negligible amount of heat. The other detecting element is used as a heat-generating element which is energized and heated to a temperature that is higher by a given value than that of the temperature-measuring element. This heat-generating element is adapted to determine the flow rate of the fluid, by detecting the amount of an electric current required to be applied to the heat-generating element for maintaining the above-indicated temperature difference.

In the thermal flowmeter of the above type, a quantity Q of heat which is generated by the heat-generating element is represented by a sum of a quantity Q1 of heat Which is transferred to and dissipated into the fluid flowing in the passage, and a quantity Q2 of heat which is transferred to and dissipated into the wall of the fluid passage, through the electrical conductors and the electrically conductive supports. The quantity Q1 varies with the flow rate of the fluid flowing in the passage, while the quantity Q2 does not vary with the flow rate of the fluid. Accordingly, the amount of the electric current applied to the heat-generating element corresponds to the flow rate of the fluid flowing in the passage, when the current is controlled so that the temperature difference between the heat-generating element and the temperature-measuring element (having the same temperature as the fluid) is kept constant. It follows that the thermal flowmeter is able to determine the flow rate of the fluid, based on the amount of the controlled current applied to the heat-generating element.

Of the quantity Q of the heat generated by the heat-generating element, the quantity Q2 of the heat dissipated into the wall of the fluid passage is determined, depending upon the materials, sizes, or other conditions of the heat-generating element and the conductive supports for supporting the element. In practice, a flowmeter having a specific design, such as installed on automotive internal combustion engines, is often produced in a relatively large lot size, such that the heat-generating element and the conductive supports of each product satisfy the nominal conditions. In such a case, the flow rate of the fluid is calculated based on the amount of the current applied to the heat-generating element, assuming that all of the individual products have the same quantity Q2 of the heat dissipated into the wall of the fluid passage.

However, a study of the inventors of the present invention revealed that a relatively large variation in the quantity Q2 of the heat transferred from the heat-generating element to the wall of the fluid passage exists among the individual products of the flowmeter, even though they are continuously produced under the same condition. Accordingly, the amount of an electric current applied to the heat-generating element for maintaining the temperature difference between the heat-generating and temperature-measuring elements differs from one product to another, even if the flow rate of the fluid is constant. Consequently, the individual flowmeters suffer from a variation in the measurement due to the variation in the quantity Q2 of the heat dissipated into the wall of the fluid passage.

In the thermal flowmeter, both of the electrical conductors of the heat-generating element, and the conductive supports to which the conductors are secured, generally take the form of an electrically conductive thin wire. When the conductors are secured to the conductive supports by welding, for example, it is difficult to accurately position the conductors relative to the corresponding conductive supports, resulting in a variation in the welding positions of the supports among the individual flowmeters. Namely, the individual flowmeters have different conditions of heat transfer between the heat-generating element and the wall of the fluid passage, due to a difference in the distance therebetween, which results from the positioning error. Consequently, there arises a variation in the quantities Q2 of the heat dissipated from the heat-generating elements into the wall of the fluid passage, among the individual flowmeters, whereby the flowmeters suffer from reduction in accuracy in determining the fluid flow rate.

Similarly, the above-described problem of the heat-generating element is encountered by the temperature-measuring element. Namely, the temperature-measuring element also suffers from a variation among the individual flowmeters, in the condition of heat transfer between the element and the wall of the fluid passage, due to the variation in the positional relationship between the conductors and the conductive supports (wall of the fluid passage), which are difficult to be exactly positioned relative to each other when secured to each other. If the wall of the fluid passage has different thermal influences upon the temperature-measuring elements of the individual flowmeters, due to the variation in the condition of heat transfer, the values of the fluid temperature measured by the temperature-measurement elements involve different errors corresponding to the different thermal influences, resulting in reduction in the measuring accuracy of the temperature-measurement element, and eventually in the detecting accuracy of the flowmeter for determining the flow rate of the fluid.

SUMMARY OF THE INVENTION

The present invention was developed in the light of the prior art situation as described above. It is therefore an object of the present invention to provide a thermal flowmeter which is capable of determining a flow rate of a fluid flowing in a passage, with significantly improved accuracy, without suffering from a variation in the condition of heat transfer between a detecting element and a wall defining the passage.

The above object may be achieved according to the principle of the present invention, which provides a thermal flowmeter for determining a parameter of a fluid flowing through a passage, including a detecting element, and a pair of electrically conductive supports fixed to a wall defining the passage for supporting the detecting element, the detecting element comprising a substrate, an electrically resistive body disposed on the substrate and having an electrical resistance which varies with an ambient temperature, and a pair of electrical conductors provided at opposite ends of the support and electrically connected to the electrically resistive body, the detecting element being positioned in the passage such that the electrical conductors are secured to the electrically conductive supports, wherein the electrically conductive supports have respective engaging portions which engage the electrical conductors, respectively, for positioning the detecting element with respect to the wall of the passage.

In the thermal flowmeter constructed as described above according to the present invention, the electrical conductors of the detecting element are secured to the electrically conductive supports by welding, for example, with the engaging portions of the supports held in engagement with the electrical conductors. Thus, the electrical conductors are accurately positioned relative to the electrically conductive supports so that the detecting element is held in position within the fluid passage.

In the thermal flowmeter according to the invention, therefore, there exists an effectively reduced variation in the condition of heat transfer between the detecting element and the wall of the passage, among the individual products of the flowmeter, whereby the measuring accuracy of the present flowmeter is significantly improved.

BRIEF DESCRIPTION OF THE DRAWINGS

The foregoing and other objects, features and advantages of the present invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
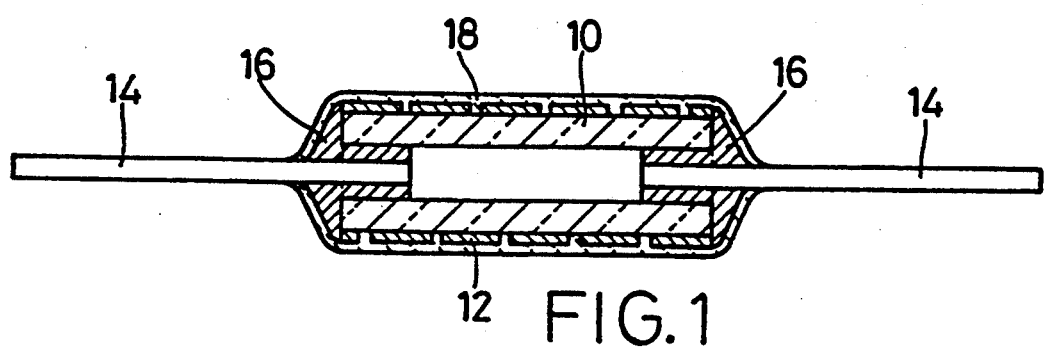
FIG. 1 is a schematic elevational view in longitudinal cross section of a detecting element which is suitably used for a thermal flowmeter constructed according to the present invention.

Referring first to the cross sectional view of FIG. 1, there is illustrated a detecting element which is suitably used for a thermal flowmeter as one embodiment of the present invention. In the figure, reference numeral 10 denotes a cylindrical substrate formed of alumina. The cylindrical substrate 10 has an outer circumferential bearing surface on which a thin platinum layer 12 having a suitable width is formed in a spiral pattern. This platinum layer 12 serves as an electrically resistive body whose electrical resistance varies with the ambient temperature. The platinum layer 12 may be formed by first applying a platinum film by a sputtering technique over the entire area of the outer circumferential surface of the cylindrical substrate 10, and then trimming the platinum film by a laser such that the spiral platinum layer 12 is defined by a spiral groove formed in the platinum film.

A pair of lead wires or electrical conductors 14, 14 are inserted suitable distances at their end portions in respective end portions of a central bore of the cylindrical substrate 10. The lead wires 14 are made of an electrically conductive material such as stainless steel or platinum. These lead wires 14 are secured to the cylindrical substrate 10 by respective connectors 16, which are formed by baking an electrically conductive paste principally made of platinum, for example. The connectors 16 also function to electrically connect the lead wires 14 to respective ends of the platinum layer 12.

The detecting element as shown in FIG. 1 further includes a protective layer in the form of a glass coating 18, which covers the entire area of the outer surface of the cylindrical substrate 10 on which the platinum layer 12 and the connectors 16 are formed, such that the coating 18 is secured to outer surfaces of the platinum layer 12 and the connectors 16.

Figure 2:
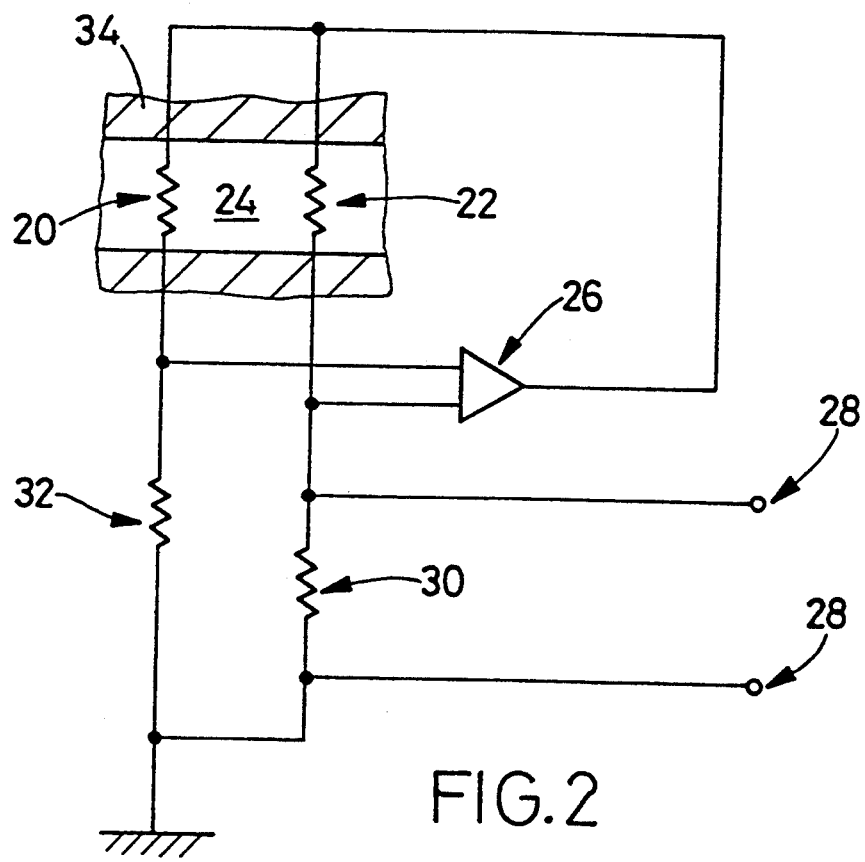
FIG. 2 is a schematic diagram illustrating a control circuit for controlling an electric current applied to a thermal flowmeter having two detecting elements as shown in FIG. 1.

Generally, the thermal flowmeter includes two detecting elements constructed as described above, one of which serves as a temperature-measuring element 20, and the other of which serves as a heat-generating element 22. As shown in FIG. 2, the two detecting elements 20, 22 are disposed within a fluid passage 24 in which a fluid to be measured flows.

As is known in the art, the temperature-measuring and heat-generating elements 20, 22 are connected to a control circuit which consists of a bridge circuit including two resistors 30, 32. This control circuit is adapted to apply to the temperature-measuring element 20 an electric current which is so small as to generate a negligible amount of heat, so that the element 20 has the same temperature as the fluid to be measured. Thus, the temperature-measuring element 20 is adapted to measure the temperature of the fluid, by detecting a change in the electrical resistance of the platinum layer 12 of the element 20. On the other hand, the amount of an electric current applied to the heat-generating element 22 is controlled by a differential amplifier 26, in a feedback manner, based on the electrical resistance of the temperature-measuring element 20, so that the temperature of the heat-generating element 22 is kept higher by a given constant value than that of the temperature-measuring element 20. With the two detecting elements 20, 22 energized in the above-described manner, the flow rate of the fluid flowing in the fluid passage 24 is calculated, based on a signal (current value) which is generated between output terminals 28, 28.

In the thermal flowmeter of the present invention, the temperature-measuring element 20 is constituted by a detecting element having an electrical resistance of several hundreds of ohms, while the heat-generating element 22 is constituted by a detecting element having an electrical resistance of several tens of ohms. When the detecting element as described above referring to FIG. 1 is used as the element 20, 22, the electrical resistance of the element 20, 22 may be suitably determined by adjusting the size of the cylindrical substrate 10, the thickness and pitch of the spirally-patterned platinum layer 12. For example, the platinum layer 12 having a thickness of about 3,000–6,000 A is formed on the cylindrical substrate 10 having an outside diameter of 0.5 mm and a length of 2 mm, such that the spiral groove formed by laser trimming to define the platinum layer 12 has a width of 25 $\mu$m. In this case, the detecting element 20, 22 may be given an electrical resistance ranging from several ohms($\Omega$) to about 1,000$\Omega$, by selecting the width of the platinum layer 12 within a range from 300 $\mu$m to 20 $\mu$m. More particularly, a detecting element having an electrical resistance of about 400$\Omega$ is favorably used as the temperature-measuring element 20, and a detecting element of about 10$\Omega$ is favorably used as the heat-generating element 22. These detecting elements may be readily obtained by suitably determining the width of the platinum layer 12.

Figure 3:
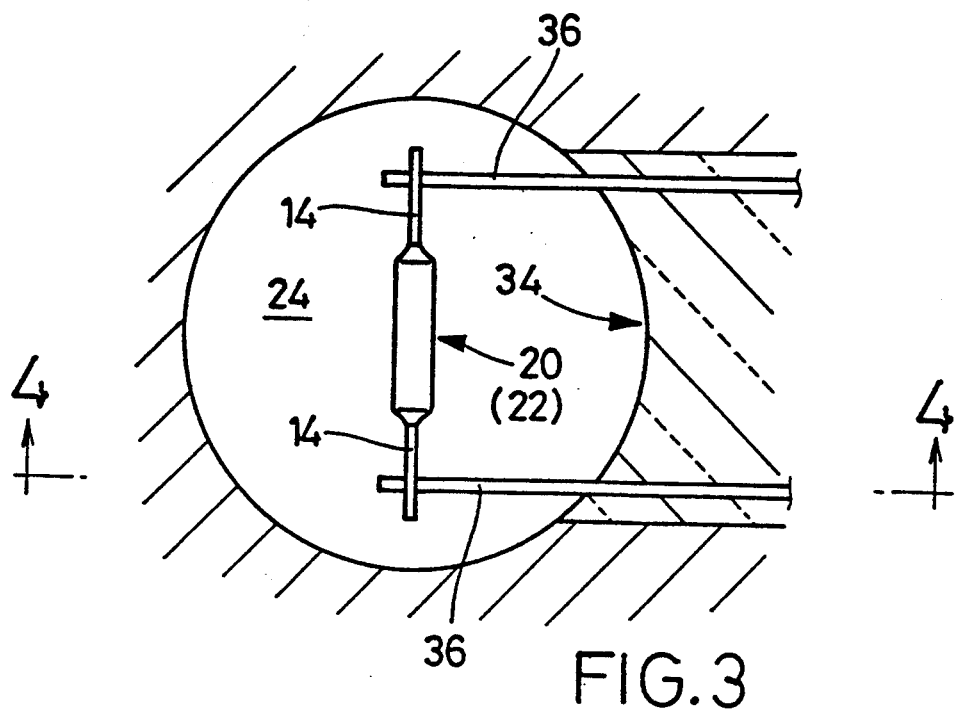
FIG. 3 is a view illustrating one of the two detecting elements of the thermal flowmeter of FIG. 2, which is disposed in position in a fluid passage.
Figure 4:
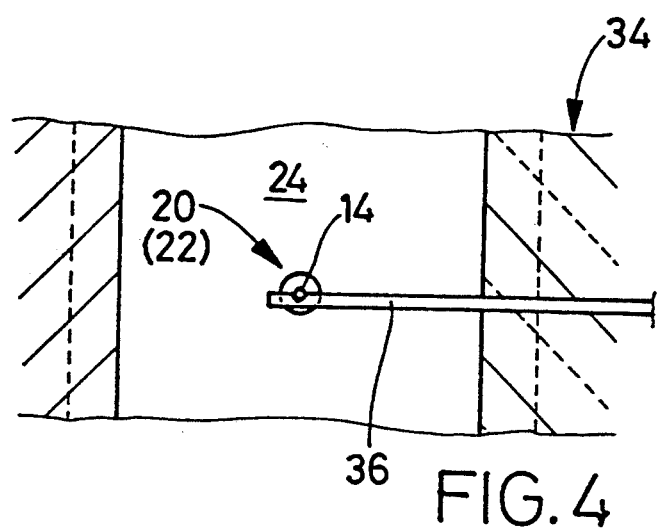
FIG. 4 is a cross sectional view taken along lines 4—4 of FIG. 3.

The temperature-detecting element 20 and the heat-generating element 22 are disposed within the the fluid passage 24, such that the elements 20, 22 are spaced apart from each other by a predetermined distance. Each of the detecting elements 20, 22 is supported by a pair of electrically conductive supports in the form of support wires 36, 36, which are made of an electrically conductive material such as stainless steel or platinum. The support wires 36 are fixed to a passage wall 34 defining the fluid passage 24, such that the support wires 36 protrude a suitable distance from the passage wall 34 into the fluid passage 24, as shown in FIGS. 3 and 4. More particularly, the lead wires 14, 14 of each detecting element 20 (22) are secured at their opposite distal portions to the support wires 36, 36, by spot welding or laser welding, for example.

Figure 5:
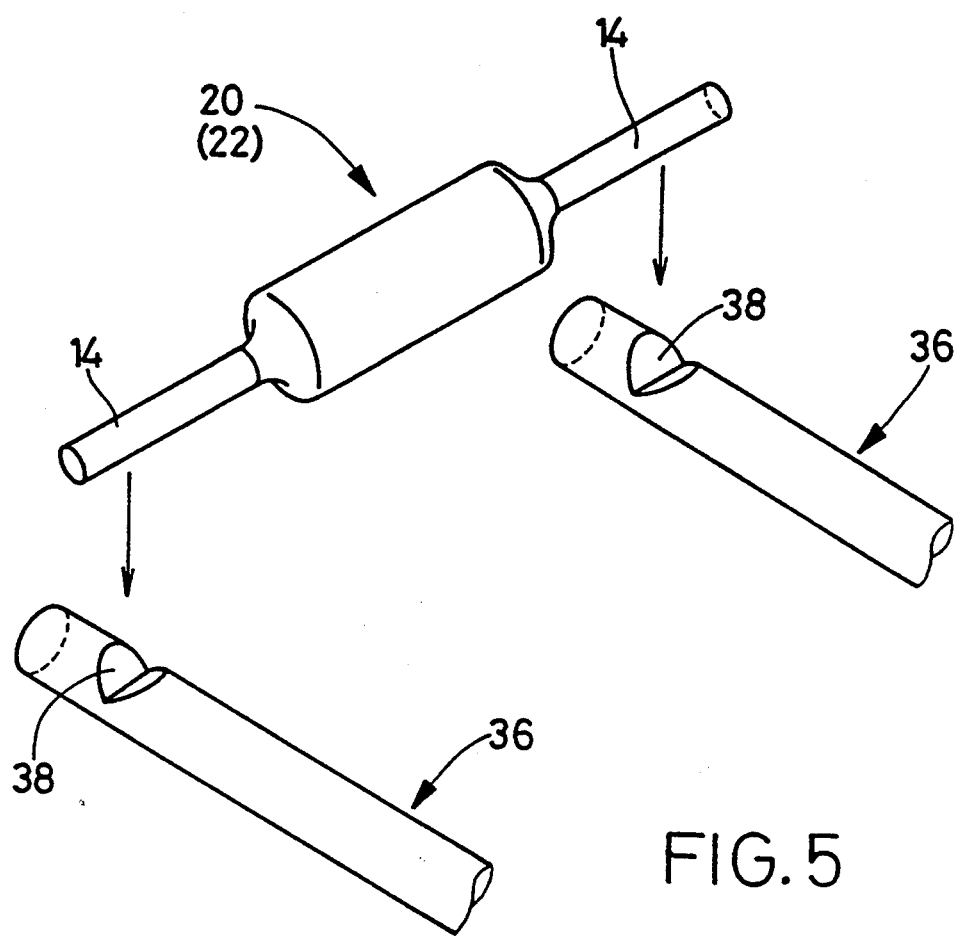
FIG. 5 is a perspective view explaining a manner of attaching the detecting element of the thermal flowmeter of FIG. 3, to support wires for supporting the element.

Each of the support wires 36, 36 supporting the detecting element 20 (22) has an engaging portion in the form of a notch 38 formed at a position thereof which is spaced by a predetermined distance from an inner surface of the passage wall 34, as shown in FIG. 5. With the lead wires 14 of the detecting element 20 (22) partially received in the corresponding notches 38 formed in the support wires 36, the lead wires 14 may be easily positioned relative to the support wires 36, with improved accuracy, when the lead wires 14 are secured by welding to the support wires 36. This arrangement effectively prevents errors in positioning the lead wires 14 relative to the support wires 36 (i.e., Passage wall 34), which errors may otherwise occur due to vibrations of the relevant members, or abutting contact of a welding torch with the lead wires 14.

When the thermal flowmeter is produced in a large lot size according to the present invention, the positions of the notches 38 formed in the support wires 36 for all Products are determined such that the distance between the notches 38 and the inner surface of the passage wall 34 is made constant. Therefore, the detecting elements 20, 22 of all products are located substantially in the same positions relative to the support wires 36, namely, relative to the wall 34, when the lead wires 14 of the elements 20, 22 are secured to the support wires 36. This makes it possible to minimize or eliminate a variation in the condition of heat transfer between the detecting element 20, 22 and the passage wall 34 among the individual products of the thermal flowmeter.

With the lead wires 14 of the detecting elements 20, 22 positioned by means of the notches 38 formed in the support wires 36, there exists a significantly reduced variation in a quantity (Q) of heat generated by the heat-generating element 22, in particular, a quantity (Q2) of heat transferred (dissipated) from the lead wires 14 to the passage wall 34 through the support wires 36. In the present flowmeter, it is also possible to effectively reduce or eliminate a variation in a thermal influence of the passage wall 34 upon the temperature-measuring element 20. Thus, the accuracy of the flowmeter in measuring the flow rate of the fluid is significantly improved.

In the thermal flowmeter constructed as described above, the lead wires 14 of the detecting elements 20, 22 can be easily secured to the support wires 36 by welding, while being held in position by the notches 38 formed in the support wires 36. In addition, the provision of the notches 38 is effective to prevent incomplete welding between the led wires 14 and the support wires 36, thereby preventing occurrence of defective products and assuring greatly improved reliability of the flowmeter.

While the present invention has been described in its preferred embodiment, for illustrative purpose only, it is to be understood that the invention is by no means limited to the details of the illustrated embodiment, but may be otherwise embodied.

The specific construction of the detecting element used for the present thermal flowmeter is not limited to that of the illustrated embodiment. That is, the flowmeter may employ various known detecting elements, such as one including a metallic wire which is coiled around a support to function as an electrically resistive body.

In the illustrated embodiment of FIG. 5, the support wires 36 for supporting the temperature-measuring element 20 and the heat-generating element 22 are formed with respective engaging portions in the form of the notches 38, for engagement with the lead wires 14 of these elements 20, 22. However, the engaging portions may be formed in the support wires 36 for only one of the detecting elements 20, 22, so that the one detecting element is accurately positioned relative to the support wires 36. In this case, the measuring accuracy of the flowmeter may be improved to a certain extent.

Figure 6:
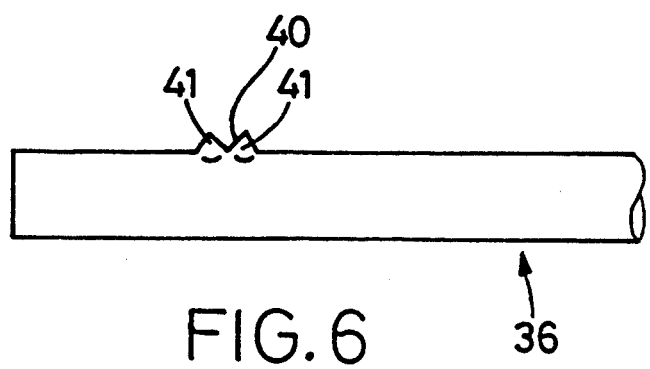
FIGS. 6 and 7 are fragmentary views showing in enlargement further forms of engaging portions of the support wires, which are suitably employed for the thermal flowmeter of the invention.
Figure 7:
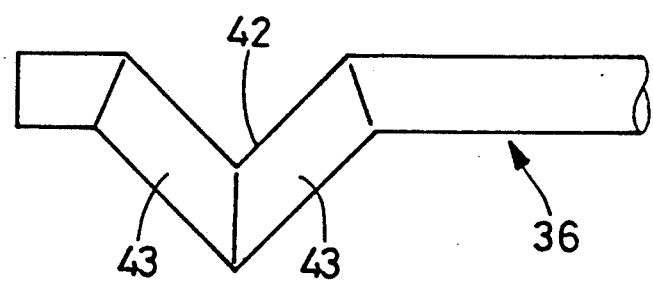

The engaging portions formed in the electrically conductive supports are not limited to notches as formed in the illustrated embodiment, but may be replaced by any other engaging means provided that the engaging means is engageable with the lead wires of the detecting element, for positioning the element relative to the supports. For example, a recess or notch 40 may be defined by and between two protrusions 41 formed on the support wire 36 (electrically conductive support), to provide the engaging portion, as shown in FIG. 6. Alternatively, the support wire 36 may have two bent portions 43 which define a V-shaped recess 42 for engagement with the lead wire 14, as shown in FIG. 7.

The present invention is advantageously applicable particularly to the case where the flowmeter having the same design is produced in a large lot size, since a variation in the measuring accuracy among the individual products can be effectively minimized by improved positioning accuracy of the lead wires 14 relative to the support wires 36. However, the present invention is also advantageously applicable to the case where the number of production of the flowmeter is small, for example, only one piece is produced. In this case, the detecting element may be easily secured to the electrically conductive supports with improved efficiency, thereby avoiding occurrence of a defective product due to incomplete bonding between the element and the supports. Thus, the flowmeter constructed according to the invention has significantly improved reliability.

Further, the positions and orientations of the detecting elements within the fluid passage, and the manner of applying an electric current to the detecting elements are not limited to those of the illustrated embodiments. While other specific examples of the invention will not be provided, it is to be understood that the present invention may be embodied with various changes, modifications and improvements which may occur to those skilled in the art, without departing from the spirit and scope of the invention.

What is claimed is:

1. A thermal flowmeter for determining a parameter of a fluid flowing through a passage, including a detecting element, and a pair of electrically conductive supports fixed to a wall defining said passage for supporting said detecting element, said detecting element comprising a substrate, an electrically resistive body disposed on said substrate and having an electrical resistance which varies with an ambient temperature, and a pair of electrical conductors provided at opposite ends of said substrate and electrically connected to said electrically resistive body, each of said electrical conductors having a circumferential surface, said electrically conductive supports having respective engaging portions which engage said electrical conductor, respectively, said detecting element being positioned in said passage such that said electrical conductors are secured by welding to said respective engaging portions of said pair of electrically conductive supports, wherein each of said engaging portions has notch means for engaging said circumferential surface of a corresponding one of said electrical conductors to position said detecting element with respect to said wall of said passage and thereby establish a consistent amount of heat flow from said detecting element to said wall of said passage, said notch means of one of said engaging portions being open in the same direction as said notch means of the other of said engaging portions.

2. A thermal flowmeter according to claim 1, wherein each of said pair of electrical conductors consists of a metallic wire.

3. A thermal flowmeter according to claim 1, wherein said substrate consists of a cylindrical member which has a circumferential outer surface on which said electrically resistive body is formed, said cylindrical member further having a bore having opposite open end portions into which end portions of said electrical conductors are inserted.

4. A thermal flowmeter for determining a parameter of a fluid flowing through a passage, including a detecting element, and a pair of rod-shaped electrically conductive supports fixed to a wall defining said passage for supporting said detecting element, each of said electrically conductive supports having a circumferential surface, said detecting element comprising a substrate, an electrically resistive body disposed on said substrate and having an electrical resistance which varies with an ambient temperature, and a pair of electrical conductors provided at opposite ends of said substrate and electrically connected to said electrically resistive body, each of said electrical conductors having a circumferential surface, said rod-shaped electrically conductive supports having respective engaging portions which engage said electrical conductors, respectively, said detecting element being positioned in said passage such that said electrical conductors are secured by welding to said respective engaging portions of said pair of electrically conductive supports, each of said engaging portions having a notch for engaging said circumferential surface of a corresponding one of said electrical conductors and thereby positioning said detecting element with respect to said wall of said passage, each said notch being engraved in said circumferential surface of each said rod-shaped electrically conductive support in a direction in which the corresponding one of said electrical conductors extends, and said notch of one of said engaging portions being open in the same direction as said notch of the other of said engaging portions.

* * * * *